United States Patent
Ebersole et al.

(10) Patent No.: US 10,657,503 B1
(45) Date of Patent: May 19, 2020

(54) SYSTEM AND METHOD OF PROVIDING A CUSTOMER WITH METHOD OF MAKING A PAYMENT TO A THIRD PARTY USING A REMOTE DISPENSING MACHINE

(75) Inventors: Elizabeth Martin Ebersole, Washington, DC (US); Julio Farach, Atlanta, GA (US); Jill Vogel Sorg, Richmond, VA (US); Donald Jeffrey Smith, Richmond, VA (US); Hector Luis Crespo, Frisco, TX (US); Jonathan Jewett Beam, Wolfeboro, NH (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 533 days.

(21) Appl. No.: 11/857,861

(22) Filed: Sep. 19, 2007

(51) Int. Cl.
*G06Q 20/10* (2012.01)

(52) U.S. Cl.
CPC ......... *G06Q 20/10* (2013.01); *G06Q 20/1085* (2013.01)

(58) Field of Classification Search
USPC ...................................................... 705/35–45
See application file for complete search history.

(56) References Cited

U.S. PATENT DOCUMENTS

| | | | | |
|---|---|---|---|---|
| 5,993,047 | A * | 11/1999 | Novogrod et al. | 700/231 |
| 6,484,933 | B1 * | 11/2002 | Zimmerman et al. | 235/375 |
| 6,516,996 | B1 * | 2/2003 | Hippelainen | 235/379 |
| 7,155,411 | B1 * | 12/2006 | Blinn | G06Q 20/02 705/40 |
| 7,611,409 | B2 * | 11/2009 | Muir et al. | 463/29 |
| 8,615,487 | B2 * | 12/2013 | Gomez et al. | 707/612 |
| 2002/0066017 | A1 * | 5/2002 | Wei et al. | 713/170 |
| 2002/0161708 | A1 | 10/2002 | Offer | |
| 2003/0028481 | A1 * | 2/2003 | Flitcroft et al. | 705/39 |
| 2003/0078094 | A1 * | 4/2003 | Gatto et al. | 463/25 |
| 2003/0088470 | A1 * | 5/2003 | Cuervo | 705/16 |

(Continued)

FOREIGN PATENT DOCUMENTS

| | | | | |
|---|---|---|---|---|
| WO | WO 2003/023674 | A1 * | 3/2003 | |
| WO | WO 2006/114613 | A1 * | 11/2006 | G06Q 30/00 |

OTHER PUBLICATIONS

Emergine Technologies for Mobile Commerce. Editorial. Jounal of Theoretical and Applied Electronic Commerce Research. Aug. 2006. vol. 1, Issue 2.pp. 1-5. http://www.jtaer.com/aug2006/editorial_p0.pdf.*

(Continued)

*Primary Examiner* — Bennett M Sigmond
*Assistant Examiner* — Gregory S Cunningham, II
(74) *Attorney, Agent, or Firm* — Troutman Sanders LLP; Christopher J. Forstner; John A. Morrissett

(57) ABSTRACT

Systems and methods for a financial transaction system are provided. Additionally, computer-implemented methods for providing a customer with a method of making a payment to a third party. These methods may include generating a token associated with financial transaction information and representing a single transaction to the third party on behalf of the customer, where the financial transaction information may include a payment amount, transmitting the token based on the financial transaction information to a system, and receiving the token from the third party at the remote dispensing machine.

12 Claims, 5 Drawing Sheets

(56) References Cited

U.S. PATENT DOCUMENTS

| | | | |
|---|---|---|---|
| 2003/0088514 A1* | 5/2003 | Sesek | 705/43 |
| 2003/0163423 A1* | 8/2003 | Holst-Roness | 705/40 |
| 2003/0216997 A1 | 11/2003 | Cohen | |
| 2003/0236746 A1* | 12/2003 | Turner et al. | 705/40 |
| 2004/0044621 A1* | 3/2004 | Huang et al. | 705/40 |
| 2004/0082384 A1* | 4/2004 | Walker et al. | 463/40 |
| 2004/0083168 A1 | 4/2004 | Kuth et al. | |
| 2004/0107165 A1* | 6/2004 | Blair et al. | 705/40 |
| 2004/0267663 A1* | 12/2004 | Karns et al. | 705/40 |
| 2005/0107155 A1* | 5/2005 | Potts | A63F 3/00157 463/25 |
| 2005/0187873 A1 | 8/2005 | Labrou et al. | |
| 2005/0192899 A1 | 9/2005 | Reardon | |
| 2006/0163341 A1* | 7/2006 | Tulluri | G06Q 20/10 235/379 |
| 2006/0294007 A1* | 12/2006 | Barthelemy | 705/40 |
| 2007/0022053 A1 | 1/2007 | Waserstein et al. | |
| 2007/0157021 A1* | 7/2007 | Whitfield | G06Q 20/02 713/156 |
| 2007/0202941 A1* | 8/2007 | Miltenberger et al. | 463/25 |
| 2007/0233615 A1* | 10/2007 | Tumminaro | G06Q 20/12 705/75 |
| 2007/0255653 A1* | 11/2007 | Tumminaro | G06Q 20/10 705/39 |
| 2007/0260558 A1* | 11/2007 | Look | 705/76 |
| 2008/0048025 A1* | 2/2008 | Fitzgerald et al. | 235/380 |
| 2008/0083826 A1* | 4/2008 | Henry et al. | 235/379 |
| 2008/0085769 A1* | 4/2008 | Lutnick et al. | 463/41 |
| 2008/0207296 A1* | 8/2008 | Lutnick et al. | 463/16 |
| 2009/0319360 A1* | 12/2009 | Salemi | G06Q 20/102 705/14.25 |
| 2010/0205095 A1* | 8/2010 | Ostrovsky | G06Q 20/04 705/44 |
| 2016/0132863 A1* | 5/2016 | Dodin | G06Q 20/02 705/40 |
| 2019/0259022 A1* | 8/2019 | Bennett | G06Q 20/105 |

OTHER PUBLICATIONS

Roduner, Christof et al. Operating Appliances with Mobile Devices. May 2007. Pervasive Computing. 5th International Conference, Pervasive 2007, Toronto, Canada, May 13-16, 2007, Proceedings. LNCS, vol. 4480, Springer, pp. 198-215, Berlin Heidelberg New York, May 2007. http://www.vs.inf.ethz.ch/publ/papers/roduner2007-pervasive.pdf.*

* cited by examiner

FINANCIAL TRANSACTION INFORMATION

210
- PAYEE'S LAST NAME
- PAYEE'S FIRST NAME
- PAYMENT AMOUNT

208 TRANSMIT TO:
- ○ PAYEE
- ○ PAYER

202 WITHDRAWN FROM:
- ○ CHECKING ACCT
- ○ SAVINGS ACCT
- ○ MONEY MARKET ACCT
- ○ INVESTMENT ACCT
- ○ COMBINATION

204 REMOTE DISPENSING MACHINE FEE PAID BY:
- ○ PAYEE
- ○ PAYER
- ○ 50/50

206 SECURITY REQUIREMENT:
- ○ TOKEN ONLY
- ○ TOKEN AND SECURITY IDENTIFIER

SYSTEM AND METHOD OF PROVIDING A CUSTOMER WITH METHOD OF MAKING A PAYMENT TO A THIRD PARTY USING A REMOTE DISPENSING MACHINE

FIELD OF THE INVENTION

The present invention relates to a system and method for providing a customer with a method of making a payment to a third party using a remote dispensing machine.

BACKGROUND OF THE INVENTION

The financial industry continuously evolves from a system heavily dependent upon paper transactions to a paperless system that uses digital technology to complete many financial transactions. For example, to replace making payments using paper checks, many customers of financial institutions may use a check card that may automatically and seamlessly transfer money from one account to another. Following this paperless trend, more and more customers of financial institutions may be decreasing the amount they use and/or possess cash.

Despite this continuous evolution in the financial industry, some individuals still may not be associated with a financial institution. Accordingly, these individuals may not have a financial account associated with a financial institution. Many customers of financial institutions may maintain payer-payee relationships with these individuals. For this reason, many customers may be required to physically visit a branch and/or Automated Teller Machine ("ATM") associated with a financial institution to withdraw cash to fulfill their financial obligations.

SUMMARY OF THE INVENTION

At least one exemplary embodiment may provide a computer-implemented method for providing a customer with a method of making a payment to a third party using a remote dispensing machine. This embodiment may include generating a token associated with financial transaction information and representing a single transaction to the third party on behalf of the customer, where the financial transaction information may include a payment amount, transmitting the token based on the financial transaction information to a system, and receiving the token from the third party at the remote dispensing machine.

Embodiments may also provide a financial transaction system for providing a customer with a method of making a payment to a third party using a remote dispensing machine. These embodiments may include a processor module to process financial transaction information associated with a financial transaction, a security module to provide a token associated with the financial transaction and a payment amount and representing a single transaction to the third party on behalf of the customer to a system, and the security module to authenticate the token received from the third party at the remote dispensing machine.

Additional embodiments may provide a computer-implemented method for providing a customer with a method of making a payment to a third party using a remote dispensing machine. This embodiment may include receiving financial transaction information from the customer via a customer system, where the financial transaction information may be associated with a financial transaction and the payment amount, generating a token associated with the financial transaction information and the payment amount and representing a single transaction to the third party on behalf of the customer, transmitting the token based on the financial transaction information to a system, receiving the token and one or more security identifiers from the third party at the remote dispensing machine, and dispensing the payment amount to the third party at the remote dispensing machine.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 2 depicts an exemplary embodiment of a customer-based interface displaying a screen display of financial transaction information according to at least one embodiment of the disclosure;

DETAILED DESCRIPTION

Figure 1A:
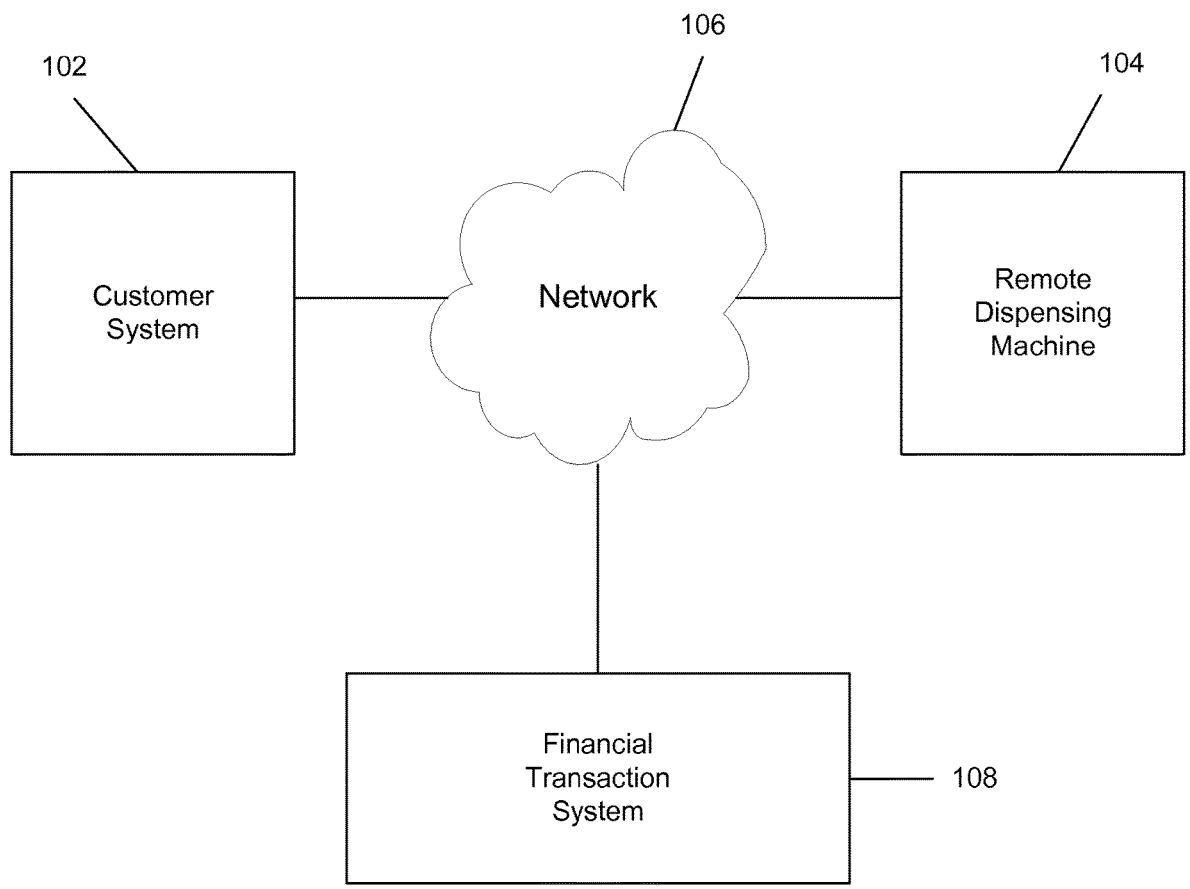
FIG. 1a depicts a system level block diagram illustrating components of a system for providing a customer with a method of making a payment to a third party using a remote dispensing machine according to at least one embodiment of the disclosure.

The following description is intended to convey a thorough understanding of the embodiments described by providing a number of exemplary embodiments and details involving systems and methods for providing a customer with a method of making a payment to a third party using a remote dispensing machine. It should be appreciated, however, that the present invention is not limited to these specific exemplary embodiments and details. It is further understood that one possessing ordinary skill in the art, in light of known systems and methods, would appreciate the use of the invention for its intended purposes and benefits in any number of alternative embodiments, depending on specific design and other needs.

Individual customers may interact with a financial transaction system to process and implement a financial transaction on behalf of a customer to make a payment to a third party. A financial transaction system may function as a host system that receives financial transaction information associated with a payment amount and a token and/or one or more security identifiers from a third party at a remote dispensing machine as input. Based on a payment amount associated with the financial transaction and the token, a financial transaction system may dispense the payment amount in cash to a third party using a remote dispensing machine.

A remote dispensing machine may include any software and/or hardware used to dispense cash and/or any other negotiable item to a third party. For example, a remote dispensing machine may include an Automated Teller Machine ("ATM").

According to various embodiments of the disclosure, a customer may interact with a financial transaction system to create a customer account and/or input financial transaction information. A customer may create a customer account using a customer system associated with an interface such as, for example, a web browser, to input information associated with the customer such as, the customer's name, the customer's telephone number, the customer's address, the customer's cellular telephone number, and/or the customer's e-mail address, into the financial transaction system. In addition, a customer may visit a bank branch associated with a financial transaction system to create a customer account.

A customer may also input financial account information associated with one or more financial accounts. In various embodiments, the one or more financial accounts may be associated with a financial institution associated with the financial transaction system. A financial institution may include an institution (e.g., a bank, a credit card company, an insurance company, a financial services firm, and/or other like financial institution) that may offer financial services and/or financial products. The one or more financial accounts may also be accessible by the financial transaction system.

For example, a financial account may include a checking account, savings account, money market account, investment account, and/or any other financial account. In various embodiments, a customer may establish a financial account associated with a financial institution associated with a financial transaction system while the customer interacts with the system to provide customer account information.

Once a customer has filled out the customer account information, the customer system may transmit the information from the customer system to the financial transaction system using a network. Upon receiving the information associated with the customer, the financial transaction system may assign a unique customer account number and/or password to that particular customer and store the information associated with the customer account.

To interact with a financial transaction system, a customer may also fill out and transmit financial transaction information associated with a financial transaction and a payment amount to the financial transaction system using a customer system and a network. In various embodiments, financial transaction information may include a payment amount, a name of a payee, a receiver of the token, a financial account from which to withdraw the payment amount, an identification of the fee payer, and/or a level of security to be implemented.

Financial transaction information, which may be displayed to a customer using an interface, for example, a web browser, may contain pre-filled data fields that include information already provided by the customer from previous interactions with the system and/or information accessible by the financial transaction system. For example, where accounts are known to the financial transaction system by virtue of being associated with a financial institution associated with the financial transaction system, the system may populate fields associated with the respective accounts into the interface.

In addition, a financial transaction system may detect a pattern between financial transaction information associated with two or more financial transactions filled out by the customer and may populate a data field with information that appears to be repetitive. For example, a customer may frequently use the financial transaction system to pay a particular baby sitter. Upon detecting that the payee's name (e.g., baby sitter's name) associated with the financial transaction information rarely and/or does not change from financial transaction to financial transaction, the system may pre-fill the payee's (e.g., baby sitter's name) in the financial transaction information. Once the inputting of financial transaction information is complete, a customer may send the financial transaction information to a financial transaction system for available funds verification and/or further processing.

The financial transaction system may process the customer's financial transaction information by verifying that at least the payment amount associated with the financial transaction is available in one or more financial accounts designated by the customer as the account from which the funds should be withdrawn. To verify available funds, the financial transaction system may compare the payment amount associated with the financial transaction information with the balance amount associated with the one or more designated financial accounts associated with the customer.

If, for example, the financial transaction system determines that the payment amount is larger than all the balances and/or a combination of the balances associated with one or more designated financial accounts associated with the customer, the financial transaction system may send notification to the customer that the funds are not available via the customer system. The financial transaction system may also request that the customer update the financial transaction information to add, modify, and/or correct the payment amount, for example, by decreasing the payment amount to become less than the balance of one or more designated financial accounts associated with the customer. If, however, the financial transaction system determines that the payment amount is less than at least one balance and/or a combination of balances associated with one or more designated financial accounts associated with the customer, the financial transaction system may send notification of that determination and may generate a token and/or one or more security identifiers associated with the financial transaction.

A token may include a randomly generated bar code, password, encrypted data, string of characters, and/or any other encrypted data that may be used for security purposes. It should be noted that the term "token" may be used to refer to a computer-implemented representation of randomly generated data used for security purposes and/or a tangible representation of randomly generated data used for security purposes.

A security identifier may include an additional randomly generated piece of data that may or may not be encrypted. In addition, a security identifier may include information such as an individual's name, address, social security number, Personal Identification Number ("PIN"), credit card number, and/or any other information that may be used to identify an individual.

Once a financial transaction system has generated a token and/or one or more security identifiers, the system may transmit the token and/or one or more security identifiers based on the financial transaction information. For example, the financial transaction information may indicate that the customer desired for the token and/or one or more security identifiers to be transmitted to the customer via the customer system. The financial transaction information may also indicate that the customer desired for the token and/or one or more security identifiers to be transmitted to a third party via a third party system.

A third party (e.g., a payee) may use the token and/or one or more security identifiers to receive the payment amount in cash at a remote dispensing machine. To receive the payment amount, the third party may input the token and/or one or more security identifiers into the financial transaction system via a remote dispensing machine. The financial transaction system may authenticate the token and/or the third party's identity using one or more security identifiers. If, for example, the financial transaction system is unable to authenticate the token and/or one or more security identifiers, the system may notify the third party and/or the customer of this determination. If, however, the financial system is able to authenticate the token and/or one or more security identifiers, the system may dispense the payment amount in cash to the third party to complete the financial transaction.

Once the financial transaction system determines that the financial transaction is complete, the system may cancel, delete, flag and/or otherwise render the token as unusable. Accordingly, if an individual subsequently attempts to use the token to access the payment amount, the financial transaction system may not authenticate the token and/or the user's identity.

By way of a non-limiting example, a customer may need to pay a baby sitter for his or her services for an evening. The customer may access the financial transaction system using a customer system to fill out and submit financial transaction information indicating that the payee's name is Jane Doe, the payment amount is $50.00, the payment should be withdrawn from the customer's checking account, the payee and payer (e.g., the customer) should split any fees associated with accessing cash from a remote dispensing machine, the token should be transmitted to the customer, the financial transaction system should only require the token to access the payment amount, and/or any additional information that may be associated with a financial transaction.

The financial transaction system may then verify that the customer has sufficient funds in one or a combination of designated accounts by accessing one or more designated financial accounts associated with the customer. If, for example, the customer payment amount and/or over the payment amount, the financial transaction system may transmit a token to the customer via a customer system. The token may include the baby sitter's name (e.g., Jane Doe), the payment amount (e.g., $50.00), and/or a bar code, password, and/or encrypted data for the baby sitter (e.g., third party) to input into the remote dispensing machine.

The customer may print out the token and provide it to the baby sitter as payment for their services. The baby sitter may take the token to a remote dispensing machine and use the token to access the payment amount. If, for example, the remote dispensing machine does not charge a fee, the baby sitter may receive the entire payment amount and the customer may only incur the entire payment amount. If, however, the remote dispensing machine does charge a fee, based on the financial transaction information's indication as to how any payment of fees should be divided, the baby sitter may only access the payment amount minus half of the fee charged by the remote dispensing machine and the customer may be charged the payment amount plus half of the fee charged by the remote dispensing machine.

The financial transaction system may flag the financial transaction as complete once the baby sitter receives the payment amount, and may not allow the token associated with that particular financial transaction to be used again to access the payment amount.

Referring now to FIG. 1a, a system level block diagram illustrating components of a system 100 for providing a customer with a method of making a payment to a third party using a remote dispensing machine according to at least one embodiment of the disclosure is depicted. The system 100 may include one or more customer systems 102, a network 106, one or more remote dispensing machines 104, and a financial transaction system 108.

The system 100 may be in communication with network 106. Network 106 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In exemplary embodiments of the disclosure, network 106 may include one, or any number of the exemplary types of networks mentioned above operating as a stand-alone network or in cooperation with each other. Use of the term network herein is not intended to limit the network to a single network.

Customer system 102, remote dispensing machine 104, and financial transaction system 108 may be in communication with or have access to network 106. For example, customer system 102, remote dispensing machine 104, and financial transaction system 108 may communicate with each other using network 106.

A customer may interact with financial transaction system 108 using, for example, customer system 102. Customer system 102 may be in communication with financial transaction system 108 via network 106. Customer system 102 may include, but is not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In various embodiments, customer system 102 may also include an interface to display information received from financial transaction system 108 over network 106.

Those of ordinary skill in the art will appreciate that a plurality of potential customer systems 102 may be used by respective customers to input and access financial transaction information and to access a token and/or one or more security identifiers associated with financial transaction information. For example, where network 106 includes the Internet, customer system 102 may interact with financial transaction system 108 to input financial transaction information associated with a financial transaction, access the financial transaction information, token, and/or one or more security identifiers via a web browser client installed on customer system 102, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively.

Remote dispensing machine 104 may include hardware and/or software to process a third party's request for a payment amount associated with a financial transaction and dispense the payment amount to the third party after the authentication of a token and/or one or more security identifiers associated with the financial transaction. Remote dispensing machine 104 may also include a pre-loaded amount of cash.

Hardware and/or software associated with remote dispensing machine 104 may be configured to accept one or more tokens, one or more security identifiers, and/or any other information associated with a financial transaction of dispensing a payment amount in cash to a third party as input. For example, remote dispensing machine 104 may include a barcode scanner, a keyboard, an Radio Frequency Identification ("RFID") reader, and/or speaker to accept input from the third party.

Remote dispensing machine 104 may transmit the input provided by a third party to financial transaction system 108 using network 106. Based on the input provided by a third party, remote dispensing machine 104 may receive one or more signals from financial transaction system 108 indicating that a third party's identity has been authenticated, a token has been authenticated, one or more security identifiers have been authenticated, and/or instructing remote dispensing machine 104 to output the payment amount associated with financial transaction in cash to a third party. In addition, remote dispensing machine 104 may also receive one or more signals from financial transaction system 108 indicating that a third party's identity has not been authenticated, a token has not been authenticated, one or more security identifiers have not been authenticated, and/or instructing remote dispensing machine 108 not to output the payment amount associated with financial transaction in cash to a third party.

In various embodiments, remote dispensing machine 104 may include an Automated Teller Machine (ATM) and/or any device that may be used to dispense a payment amount in cash to a third party.

Figure 1B:
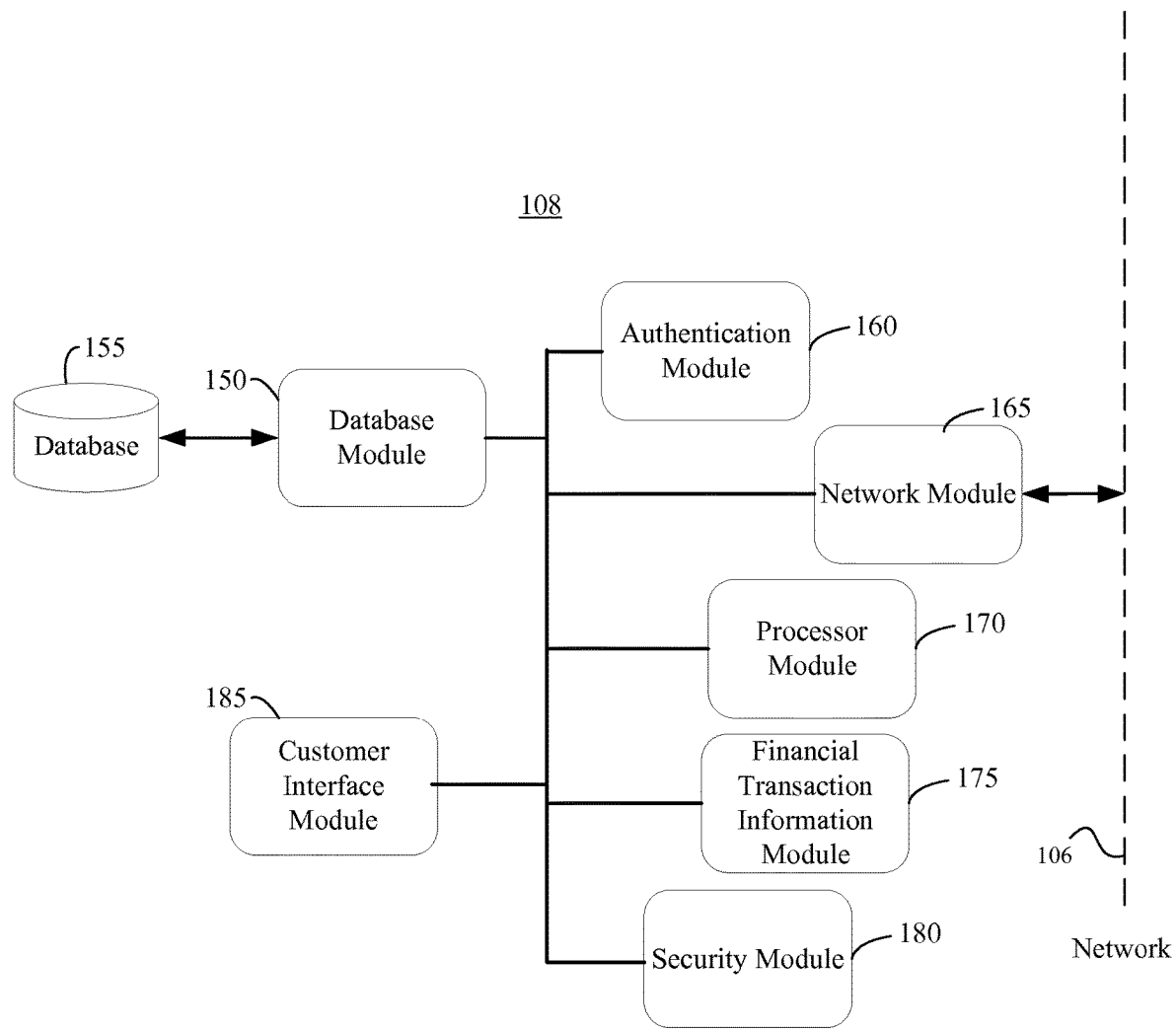
FIG. 1b depicts a system level block diagram illustrating various components of a financial transaction system according to at least one embodiment of the disclosure.

Referring now to FIG. 1*b*, a system level block diagram illustrating the various components of a financial transaction system 108 according to at least one embodiment of the disclosure is depicted. As shown in FIG. 1*b*, a financial transaction system 108 may include one or more of the following modules: a database module 150, an authentication module 160, a network module 165, a processor module 170, a financial transaction information module 175, a security module 180, and a customer interface module 185. Database module 150, authentication module 160, network module 165, processor module 170, financial transaction information module 175, security module 180, and customer interface module 185 may communicate with some or all of the modules of financial transaction system 108. The modules of financial transaction system 108 may be part of a single system, or the modules may be physically and/or logically separated. Financial transaction system 108 may be operably connected to a network (e.g., network 106) so that the modules of financial transaction system 108 may receive signals from the network and generate signals to the network.

Authentication module 160 may receive authentication information (e.g., as signals from the network 106) to authenticate users into financial transaction system 108. In various embodiments, the authentication information may be received as encrypted ciphertext and decrypted according to protocols well known in the art. In various embodiments, authentication information may include a unique customer account number, the customer's password, the customer's telephone number, the customer's address, the customer's cellular telephone number, and/or the customer's e-mail address.

For example, authentication module 160 may have access to a plurality of customer account authentication information. In one exemplary embodiment, authentication module 160 may store data regarding a plurality of customers and their related account authentication information in database 155. Authentication module 160 may be coupled to database 155 such that authentication module 160 may access database 155 through database module 150.

In various embodiments, authentication module 160 may attempt to match the authentication information to a record that may be stored within and/or associated with financial transaction system 108. For example, authentication module 160 may attempt to match the authentication information to a record by comparing the authentication information to data within a plurality of records.

Financial transaction information module 175 may have access to financial transaction information submitted by a customer. Financial transaction information module 175 may include software and/or hardware to store and/or scan financial transaction information to determine whether the financial transaction information at least includes a payee's name, a payment amount, identification of token receiver, identification of account to withdraw funds, method of paying fees, and/or a level of security required to access a payment amount at a remote dispensing machine. In an exemplary embodiment, financial transaction information module 175 may store financial transaction information in database 155. Financial transaction information module 175 may be coupled to database 155 such that financial transaction information module 175 may access database 155 through database module 150.

Financial transaction information module 175 may also pre-fill data fields in a screen display associated with financial transaction information based on previous financial transaction information submitted by a particular customer. For example, financial transaction information module 175 may detect that a payee's name in financial transaction information from transaction to transaction rarely and/or does not change by comparing the data fields associated with a payee's name in financial transaction information associated with two or more financial transactions. Based on the result of the comparison, financial transaction information module 175 may populate data fields with data that appears to rarely change.

Processor module 170 may include software and/or hardware to process a financial transaction information. Processor module 170 may access a customer's financial transaction information in financial transaction information module 175 using network 106. Processor module 170 may also access the customer's financial transaction information in database 155 through database module 150 using network 106.

Processor module 170 may determine whether a customer has sufficient funds in one or more financial accounts and/or a combination of one or more financial accounts designated by the customer as the accounts from which the payment amount should be withdrawn to make the payment amount. To determine whether a customer has sufficient funds, processor module 170 may access one or more designated financial accounts associated with a customer. In various embodiments, processor module 170 may access one or more designated financial accounts associated with a financial institution associated with financial transaction system 108. In addition, processor module 170 may access one or more designated financial accounts accessible by financial transaction system 108.

Processor module 170 may determine whether there are sufficient funds by comparing a payment amount associated with a financial transaction with the balances of one or more designated financial accounts associated with a customer. For example, processor module 170 may access a designated checking account associated with a customer based on the financial transaction information provided by the customer. If, for example, the balance in the checking account is less than the payment amount, processor module 170 may send notification to the customer via a customer system indicating there are insufficient funds. Processor module 170 may also check all financial accounts associated with a customer to determine if a combination of balances may meet the payment amount. Processor module 170 may send notification to the customer that a combination of funds from two or more accounts may meet the payment amount and inquire to the customer whether processor module 170 should process the financial transaction using the combination of funds. If, however, there are sufficient funds in one or more designated financial accounts associated with the customer, processor module 170 may continue the financial transaction.

Security module 180 may include any software and/or hardware to generate, transmit, and/or authenticate one or more tokens and/or one or more security identifiers. Security module 180 may receive a signal from processor module 170 instructing security module 180 to generate one or more tokens associated with a financial transaction of dispensing a payment amount to a third party.

A unique token may include a randomly generated number and/or phrase associated with a financial transaction of dispensing a payment amount to a third party. A token may also include a bar code, password, and/or any encrypted message. Security module 180 may generate a token using software and/or hardware (e.g., random number generator software algorithm and/or random number generator circuit) to generate random numbers and/or phrases.

Security module 180 may associate a financial transaction of dispensing a payment amount to a particular third party by referencing the financial transaction (e.g., embedding a number indicating a particular financial transaction in the token) in the token. Security module may transmit a token to customer interface module 185 to enable transmission and subsequent display of the token on a customer system and/or a third party system using network 106.

In a separate or same transmission from the transmission of a token, security module 180 may transmit an additional security identifier to aid in accurately identifying a third party at a remote dispensing machine and/or to aid in identity theft protection. An additional security identifier may include a password, bar code, and/or personal identification number ("PIN number").

In various embodiments, based on the financial transaction information, security module 180 may transmit one or more tokens and/or one or more security identifiers to an Email inbox associated with a customer system, text message inbox associated with a customer's cellular telephone, and/or any other electronic storage associated with a customer system using network 106.

In additional embodiments, based on the financial transaction information, security module 180 may transmit one or more tokens and/or one or more security identifiers to an Email inbox associated with a third party system (not shown), text message inbox associated with a third party system, and/or any other electronic storage associated with a third party system using network 106.

A third party system may be in communication with financial transaction system 108 via network 106. A third party system may include, but is not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In various embodiments, third party system may also include an interface to display information received from financial transaction system 108 over network 106.

Security module 180 may also receive a token signal and/or security identifier signal from one or more remote dispensing machine as input for security authentication. Security module 180 may authenticate a third party's identity and/or a financial transaction at a remote dispensing machine by comparing the input signal to a record associated with that particular financial transaction information stored in financial transaction system 108. If, for example, the input signal matches the financial transaction's record and therefore authenticates a third party's identity and/or a financial transaction, security module 180 may output a signal instructing a remote dispensing machine to output the payment amount in cash to a third party using network 106. If, however, the input signal is not authenticated, security module 180 may output a signal instructing a remote dispensing machine not to output the payment amount in cash to a third party using network 106 and/or may place a flag on the customer account associated with the financial transaction information indicating possible identity theft.

Security module 180 may also use a financial transaction number to track the financial transaction to ensure that only one financial transaction associated with the financial transaction number is allowed. For example, security module 180 may allow for a financial transaction number to be used once. Security module 180 may verify that each financial transaction number received as input from a third party at a remote dispensing machine is used once by cancelling, deleting, and/or otherwise rendering each financial transaction number useless as it is received from a remote dispensing machine.

To verify that a financial transaction number has been used once, security module 180 may scan financial transaction system 108 to determine if the financial transaction number received is associated with a financial transaction number stored. If, for example, security module 180 determines a match between a financial transaction number received and a financial transaction number stored, security module 180 may transmit a signal to remote dispensing machine to continue the financial transaction. If, however, security module 180 does not determine a match between a financial transaction number received and a financial transaction number stored, security module 180 may transmit a signal to remote dispensing machine to not continue the financial transaction. In various embodiments, financial transaction system 108 may not fulfill a transaction if a financial transaction number is determined to have been previously cancelled.

Customer interface module 185 may transmit the outputs from the modules associated with financial transaction system 108 in a form that a customer and/or a third party may perceive using, for example, a customer system and/or third party system, respectively. In various embodiments, customer interface module 185 may be a web server to organize and display information viewable on software installed on a customer system and/or a third party system.

Financial transaction system 108 may also include a network module 165 operable to connect the various modules of financial transaction system 108 to network 106. Network module 165 may include any device for connecting network appliances, such as database module 150, authentication module 160, network module 165, processor module 170, financial transaction information module 175, security module 180, and/or customer interface module 185 to network 106.

Financial transaction system 108 may also include database module 150 operable to access and store various information in database 155. Database module 150 may include any device for accessing and storing various information in a database 155. In various embodiments, database 155 may store data regarding one or more customers. This data may include financial transaction information, customer account authentication information, and/or financial account information associated with a customer. Authentication module 160, processor module 170, financial transaction information module 175, security module 180, and/or customer interface module 185 may be coupled to database 155 such that authentication module 160, processor module 170, financial transaction information module 175, security module 180, and/or customer interface module 185 may access database 155 through database module 150 to store and retrieve data as needed.

Referring now to FIG. 2, an exemplary embodiment of a customer-based interface 200 displaying a screen display of financial transaction information according to at least one embodiment of the disclosure is depicted. As discussed above, a customer may interact with the financial transaction system using, for example, a web browser installed on a customer system to input and access information. By way of a non-limiting example, the financial transaction information display screen 200 may be arranged as depicted in FIG. 2. A customer may fill out one or more data fields 210 associated with a payee's name and/or the payment amount.

In various embodiments, the customer may activate one or more buttons 202 associated with a list of types of financial accounts from which a payment amount may be withdrawn. The list of types of financial accounts may include a checking account, a savings account, a money market account, an investment account, and/or any other financial account that may be associated with a customer. In various embodiments, a customer may activate a button indicating that the payment amount should be withdrawn from any combination of financial accounts associated with the customer.

As shown, a customer may activate one or more buttons 204 (e.g., clicking on) associated with how any fees that may be charged by a remote dispensing machine may be paid. For example, a customer may activate a button that indicate that the fee should be charged to a payee (e.g., a third party). Accordingly, a remote dispensing machine may dispense the payment amount minus any fee the remote dispensing machine may charge to the third party.

In addition, a customer may activate a button that indicates that the fee should be charged to a payer (e.g., a customer). Accordingly, a remote dispensing machine may dispense the payment amount to the third party and financial transaction system may reduce a financial account associated with a customer from which the payment amount is withdrawn by any fee charged by a remote dispensing machine in addition to the payment amount.

A customer may also activate a button that indicates that the payment of the fee should be shared by the payer and payee. Accordingly, a remote dispensing machine may dispense the payment amount minus half of any fee charged by a remote dispensing machine to the third party and financial transaction system may reduce a financial account associated with a customer from which the payment amount is withdrawn by half of any fee charged by a remote dispensing machine in addition to the payment amount. In various embodiments, financial transaction system may determine how fees associated with the financial transaction are to be paid.

As shown, a customer may activate one or more buttons 206 (e.g., clicking on) associated with the level of security that may be required by a third party to access a payment amount at a remote dispensing machine. For example, a customer may activate a button that indicates that a token should be the only required input provided by a third party at a remote dispensing machine to access the payment amount. In addition, a customer may activate a button that indicates that a token and one or more security identifiers may be the required input for a third party to access the payment amount at a remote dispensing machine.

A customer may also activate one or more buttons 208 (e.g., clicking on) indicating who should receive the token and/or one or more security identifiers from financial transaction system. For example, a customer may activate a button that indicates that financial transaction system should transmit a token and/or one or more security identifiers to a payee via a third party system based on additional information provided by the customer regarding a third party system associated with the third party (not shown). For example, a customer may provide a financial transaction system with a cellular telephone number associated with a third party system. Accordingly, a financial transaction system may transmit and/or text the token and/or one or more security identifiers to the third party's cellular telephone. A customer may also activate a button that indicates that financial transaction system should transmit a token and/or one or more security identifiers to a payer via a customer system. Accordingly, the customer may print out the token and/or one or more identifiers and provide it to the third party. In addition, the customer may transmit the token and/or one or more identifiers from the customer system to a third party system via a network.

Figure 3:
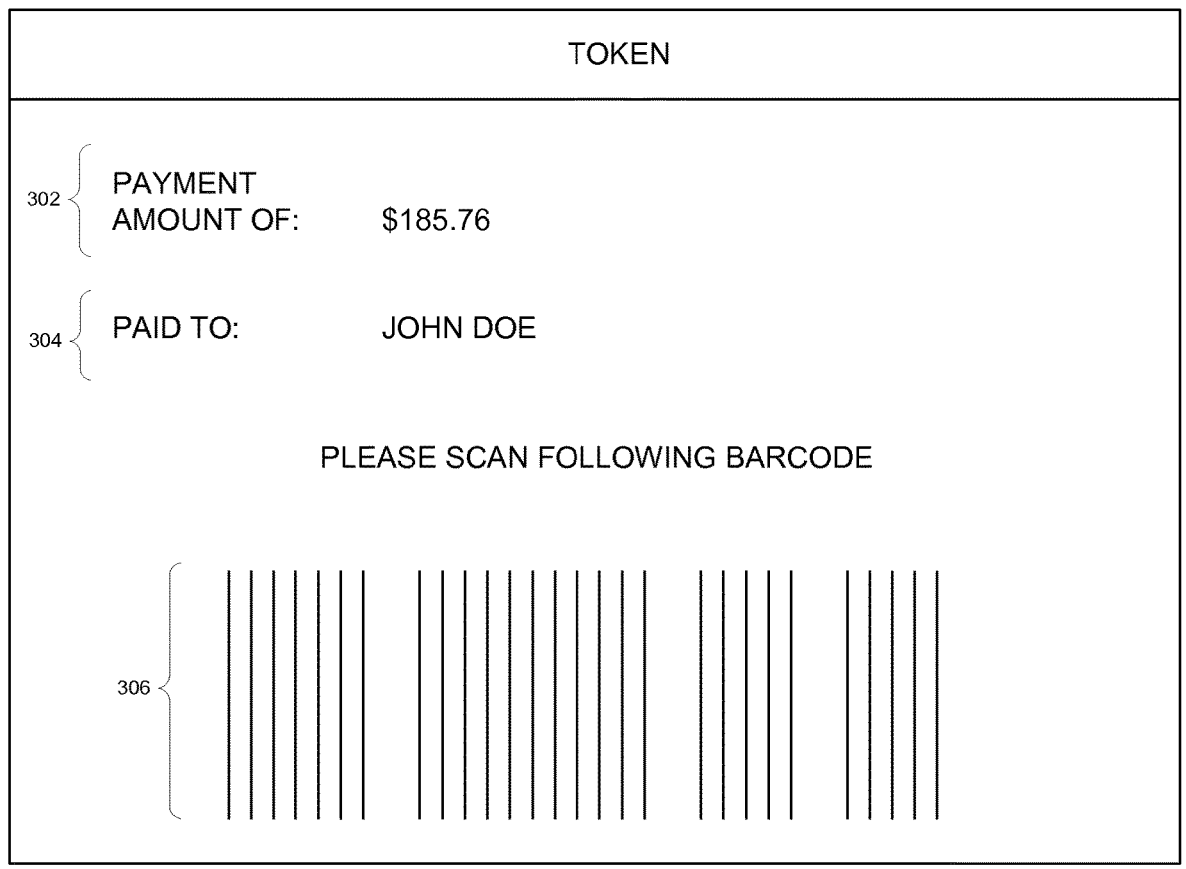
FIG. 3 depicts an exemplary embodiment of a customer-based interface displaying a screen display of a token associated with a financial transaction according to at least one embodiment of the disclosure.

Referring now to FIG. 3a, an exemplary depiction of a customer-based interface displaying a screen display 300 of a token associated with a financial transaction according to at least one embodiment is disclosed. As shown, a security module (e.g., security module 180) may output to the customer and/or third party a token and/or one or more security identifiers via a customer system and/or a third party system, respectively. As shown, for example, a token may include a payment amount 302, such as $185.76, a payee's name 304, such as John Doe, and/or a bar code 306 and/or encrypted data as a token.

A third party may use a token to access a payment amount (e.g., payment amount of $185.76 302) by inputting token 306 into a remote dispensing machine. For example, a remote dispensing machine may be configured to accept input in the form of a scanned barcode, keyed in information using a keyboard, swiping of a card with a magnetic strip, and/or voice input.

Once the financial transaction is complete by dispensing the payment amount to a third party, a financial transaction system may flag the financial transaction information associated with the financial transaction as complete. In various embodiments, a financial transaction system may delete the financial transaction information associated with a financial transaction once the financial transaction is complete.

Figure 4:
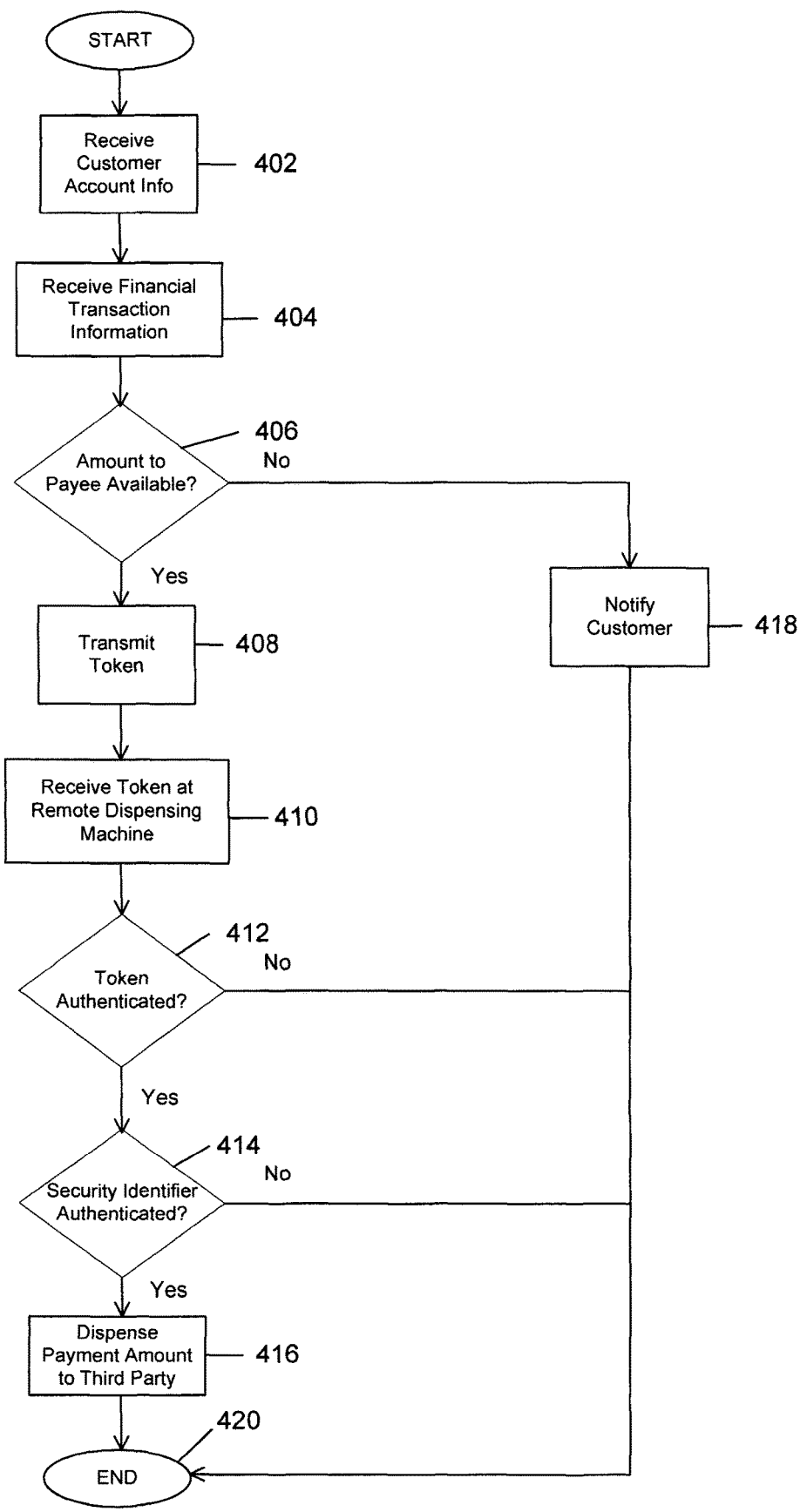
FIG. 4 depicts a flow chart detailing interactions between a financial transaction system and a customer according to at least one embodiment of the disclosure.

Referring now to FIG. 4, a flow chart 400 detailing interactions between a financial transaction system and a customer according to at least one embodiment of the disclosure is depicted. In block 402, customer account authentication information may be received. In an exemplary embodiment, the customer account authentication information may be received by a financial transaction system. Receiving the customer's account authentication information may include the customer creating a customer account.

A customer may create a customer account using a customer system associated with an interface such as a web browser, to input information associated with the customer such as the customer's name, the customer's telephone number, the customer's address, the customer's cellular telephone number, and the customer's e-mail address into the financial transaction system. A customer system may transmit information associated with a customer to a financial transaction system using a network. Upon receiving information associated with a customer, a financial transaction system may assign a unique customer account number to that particular customer and store information associated with a customer account.

If, for example, a customer is a returning user, the customer may transmit a unique customer account number to a financial transaction system using a customer system.

In block 404, a financial transaction system may receive financial transaction information from a customer via a network. A financial transaction system may store financial transaction information in a financial transaction information module (e.g., financial transaction information module 175). A financial transaction system may also store financial transaction information in a database using a database module.

In block 406, a financial transaction system may verify that at least the payment amount associated with the financial transaction information is available in one or more financial accounts associated with the customer designated as the accounts from which the payment amount should be withdrawn. Available funds verification may include the financial transaction system comparing the payment amount associated with the financial transaction information with the balance amount associated with one or more designated financial accounts associated with the customer.

If, for example, the financial transaction system determines that the payment amount is larger than all the balances and/or a combination of the balances associated with one or more designated financial accounts associated with the customer, the financial transaction system may send notification to the customer that the funds are not available via the customer system in block 418 and end the method in block 420. The financial transaction system may also request that the customer update the financial transaction information to add, modify, and/or correct the payment amount, for example, by decreasing the payment amount to become less than the balance of one or more designated financial accounts associated with the customer. If, however, the financial transaction system determines that the payment amount is less than at least one balance and/or a combination of balances associated with one or more designated financial accounts associated with the customer, the financial transaction system may send notification of that determination and may generate a token and/or one or more security identifiers associated with the financial transaction and transmit the token based on the financial transaction information in block 408.

In block 410, a third party (e.g., a payee) may use the token and/or one or more security identifiers to access the payment amount in cash at a remote dispensing machine. To access the payment amount, the third party may input the token and/or one or more security identifiers into the financial transaction system via a remote dispensing machine. The financial transaction system may authenticate the token and/or the third party's identity using one or more security identifiers in block 412 and block 414, respectively. If, for example, the financial transaction system is unable to authenticate the token and/or one or more security identifiers, the system may notify the third party and/or the customer of this determination and may end the method in block 420. If, however, the financial system is able to authenticate the token and/or one or more security identifiers, the system may dispense the payment amount in cash to the third party to complete the financial transaction in block 416. The method may end in block 420.

The embodiments of the present inventions are not to be limited in scope by the specific embodiments described herein. Thus, modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A computer-implemented method comprising:
receiving, at one or more processors and from a customer device, financial transaction information for a requested financial transaction, the customer device being associated with a plurality of financial accounts and the financial transaction information comprising a payment amount, contact information corresponding to a payee device associated with a payee, and a financial account of the plurality of financial accounts from which the payment amount is requested to be debited;
determining, by the one or more processors and based on a comparison of the payment amount to an account balance of the financial account, whether the financial account has sufficient funds to complete the requested financial transaction;
responsive to determining that the financial account has insufficient funds to complete the requested financial transaction:
determining whether a combination of the plurality of financial accounts has sufficient funds to complete the requested financial transaction; and
transmitting, to the customer device, a first message indicating that the financial account has insufficient funds to complete the requested financial transaction and requesting approval to process the requested financial transaction with funds from the combination of the plurality of financial accounts;

responsive to receiving a declination to use funds from the combination of the plurality of financial accounts for the requested financial transaction, transmitting a second message to the customer device, the second message requesting an updated payment amount;

responsive to receiving the updated payment amount, determining, by the one or more processors and based on a comparison of the updated payment amount to the account balance of the financial account, whether the financial account has sufficient funds to complete an updated requested financial transaction associated with the updated payment amount; and responsive to (i) determining that the financial account has sufficient funds to complete the requested financial transaction, (ii) receiving approval to process the requested financial transaction with the funds from the combination of the plurality of financial accounts, or (iii) determining that financial account has sufficient funds to complete the updated requested financial transaction:

generating, by the one or more processors, a security identifier and a token, the token associated with the financial transaction information and representing the payment amount and comprising a computer-implemented representation of randomly generated barcode data;

transmitting, by the one or more processors and to the payee device via a first message, the token;

transmitting, by the one or more processors and to the payee device via a second message different from the first message, the security identifier;

receiving, from the payee device and via an automatic teller machine (ATM), the token;

receiving, from the payee device and via the ATM, the security identifier;

determining, by the one or more processors and based on a comparison of the token to stored token data, whether the token is authenticated;

determining, by the one or more processors and based on a comparison of the security identifier to stored security identifier data, whether the security identifier is authenticated;

responsive to determining that at least one of the token and security identifier is not authenticated, transmitting, by the one or more processors and to the customer device and the payee device, a notification indicating that the at least one of the token and security identifier is not authenticated; and responsive to determining that both the token and the security identifier are authenticated, transmitting, by the one or more processors and to the ATM, instructions to dispense an amount of cash equal in value to the payment amount without regard as to whether the ATM is associated with the payee or any account associated with the payee.

2. The computer-implemented method of claim 1, wherein transmitting the token via the first message comprises transmitting the token to the payee device via the customer device.

3. The computer-implemented method of claim 1, further comprising dispensing, by the ATM, the payment amount to the payee responsive to receiving the instructions to dispense the amount of cash equal in value to the payment amount.

4. The computer-implemented method of claim 1, further comprising canceling, by the one or more processors, the token immediately after the amount of cash equal in value to the payment amount is dispensed.

5. A financial transaction system comprising:
one or more processors; and
memory storing instructions that, when executed by the one or more processors, cause the financial transaction system to:

receive financial transaction information from a customer device associated with a customer, wherein the financial transaction information corresponds to a requested financial transaction and indicates a payment amount, contact information corresponding to a payee device associated with a payee, and a financial of a plurality of financial accounts of the customer from which the payment amount is requested to be debited;

responsive to determining that the financial account has insufficient funds to complete the requested financial transaction, determining whether a combination of the plurality of financial accounts has sufficient funds to complete the requested financial transaction;

responsive to (i) determining that the financial account has sufficient funds to complete the requested financial transaction or (ii) receiving approval to process the requested financial transaction with the funds from the combination of the plurality of financial accounts:

generate a security identifier and a token, the token associated with the financial transaction information and representing the payment amount and comprising a computer-implemented representation of randomly generated data;

transmit the token to the payee device via a first message;

transmit the security identifier to the payee device via a second message different from the first message;

receive, from the payee device via an automatic teller machine (ATM), the token;

receive, from the payee device via the ATM, the security identifier;

determine, by the one or more processors and based on a comparison of the token to stored token data, whether the token is authenticated;

determine, based on a comparison of the security identifier to stored security identifier data, whether the security identifier is authenticated;

responsive to determining that at least one of the token and security identifier is not authenticated, transmit, to the customer device and the payee device, a message indicating that the at least one of the token and security identifier is not authenticated; and responsive to determining that both the token and the security identifier are authenticated, transmit, to the ATM, instructions to dispense an amount of cash equal in value to the payment amount without regard as to whether the ATM is associated with the payee or any account associated with the payee.

6. The financial transaction system of claim 5, wherein the instructions, when executed by the one or more processors, further cause the financial transaction system to verify that the financial account associated with the customer device contains the payment amount.

7. The financial transaction system of claim 5, wherein instructions, when executed by the one or more processors, further cause the financial transaction system to electronically transmit the token to the customer device such that the customer device is enabled to transmit the token to the payee device.

8. The financial transaction system of claim 5, further comprising an automatic teller machine configured to dispense the payment amount to a payee associated with the payee device responsive to receiving instructions to dispense the payment amount.

9. A computer-implemented method for enabling payment to a payee associated with a payee device via an automatic teller machine (ATM), the computer-implemented method comprising:

receiving, at one or more processors and from a customer device, customer authentication information;

determining, by the one or more processors and based on the customer authentication information, that the customer device is authenticated;

receiving, at the one or more processors and from the customer device, financial transaction information indicative of a requested financial transaction, the financial transaction information comprising a payment amount, identification data indicative of a name of the payee and the payee device, and information indicating a financial account of a plurality of financial accounts from which the payment amount is requested to be debited, the plurality of financial accounts being associated with the customer device;

determining, by the one or more processors and based on a comparison of the payment amount to an account balance of the financial account, whether the financial account has sufficient funds to complete the requested financial transaction;

responsive to determining that the financial account has insufficient funds to complete the requested financial transaction:
  determining whether a combination of the plurality of financial accounts has sufficient funds to complete the requested financial transaction; and
  transmitting, to the customer device, a message indicating that the financial account has insufficient funds to complete the requested financial transaction and requesting approval to process the requested financial transaction with funds from the combination of the plurality of financial accounts;
and
responsive to (i) determining that the financial account has sufficient funds to complete the requested financial transaction or (ii) receiving approval to process the requested financial transaction with the funds from the combination of the plurality of financial accounts:
  randomly generating, by the one or more processors, a token;
  transmitting, by the one or more processors and to the payee device via a first communication method, the token;
  receiving, from the payee device and via the ATM, the token;
  receiving, from the payee device and via the ATM, a first security identifier, the first security identifier being received by the payee device and from the customer device via a second communication method different from the first communication method;
  receiving, from the payee device and via the ATM, a second security identifier indicative of the name of the payee;
  determining, by the one or more processors and based on a comparison of the token to stored token data, whether the token is authenticated;
  determining, by the one or more processors and based on comparisons of (i) the first security identifier to stored first security identifier data and (ii) the second security identifier to stored second security identifier data, whether each of the first and second security identifiers are authenticated;
  responsive to determining that at least one of the token, the first security identifier, and the second security identifier is not authenticated, transmitting, by the one or more processors and to the customer device and the payee device, a message indicating that the at least one of the token, the first security identifier, and the second security identifier is not authenticated;
  responsive to determining that each of the token, the first security identifier, and the second security identifier are authenticated, transmitting, by the one or more processors and to the ATM, instructions to dispense an amount of cash equal in value to the payment amount without regard as to whether the ATM is associated with the payee or any account associated with the payee; and
  responsive to determining that the amount of cash has been successfully dispensed, determining that the token is unauthorized for future transactions.

10. The computer-implemented method of claim 1, wherein the financial transaction information received from the customer device indicates how a dispensing fee charged by ATM is to be paid.

11. The financial transaction system of claim 5, wherein the one or more processors are further configured to receive financial transaction information indicating how a dispensing fee charged by the ATM is to be paid.

12. The computer-implemented method of claim 9, wherein the financial transaction information received from the customer device is associated with information indicating how a dispensing fee charged by the ATM is to be paid.

* * * * *